United States Patent
Füssl et al.

(10) Patent No.: US 9,238,441 B2
(45) Date of Patent: Jan. 19, 2016

(54) BUSBAR FOR A POWER DISTRIBUTOR IN VEHICLES AND POWER DISTRIBUTOR HAVING SUCH A BUSBAR

(75) Inventors: Peter Füssl, Vilsbiburg (DE); Kai Hüning, Julbach (DE); Robert Bachhofer, Burgthann (DE)

(73) Assignee: Lisa Draexlmaier GmbH, Vilsbiburg (DE)

(*) Notice: Subject to any disclaimer, the term of this patent is extended or adjusted under 35 U.S.C. 154(b) by 302 days.

(21) Appl. No.: 13/635,823

(22) PCT Filed: Mar. 1, 2011

(86) PCT No.: PCT/EP2011/052995
§ 371 (c)(1),
(2), (4) Date: Nov. 26, 2012

(87) PCT Pub. No.: WO2011/120748
PCT Pub. Date: Oct. 6, 2011

(65) Prior Publication Data
US 2013/0062937 A1    Mar. 14, 2013

(30) Foreign Application Priority Data
Mar. 31, 2010   (DE) .................. 10 2010 003 515

(51) Int. Cl.
*B60L 1/00* (2006.01)
*B60R 16/02* (2006.01)
*H01H 85/044* (2006.01)
*H01H 85/055* (2006.01)

(52) U.S. Cl.
CPC .............. *B60R 16/02* (2013.01); *H01H 85/044* (2013.01); *H01H 2085/0555* (2013.01)

(58) Field of Classification Search
USPC ............................ 307/9.1; 439/76.2
See application file for complete search history.

(56) References Cited

U.S. PATENT DOCUMENTS

RE39,461 E     1/2007  Cornell et al.
2002/0031924 A1*  3/2002  Davis ................. H01R 9/2491
                                                                 439/76.2

(Continued)

FOREIGN PATENT DOCUMENTS

DE    102 32 650 A1   2/2003
DE    603 02 564 T2   8/2006

(Continued)

OTHER PUBLICATIONS

International Search Report and Written Opinion for International Application No. PCT/EP2011/052995, dated Jun. 1, 2011 (8 pages).

(Continued)

*Primary Examiner* — Rexford Barnie
*Assistant Examiner* — Xuan Ly
(74) *Attorney, Agent, or Firm* — Finnegan, Henderson, Farabow, Garrett & Dunner LLP

(57) ABSTRACT

A busbar is provided for a power distributor in vehicles. The busbar comprises at least one fastening region for fuses. The fastening region is separated by at least one slot which cuts through the busbar from the remaining part of the busbar to such an extent that the fastening region is only connected to the remaining part of the busbar by a web. The cross section of the web is smaller compared to the adjacent fastening region and the adjacent remaining part of the busbar.

7 Claims, 1 Drawing Sheet

(56) References Cited

U.S. PATENT DOCUMENTS

2003/0022536 A1    1/2003   Saito et al.
2010/0261377 A1   10/2010   Ecker

FOREIGN PATENT DOCUMENTS

| | | |
|---|---|---|
| DE | 10 2006 040 824 A1 | 3/2008 |
| DE | 202009009607 U1 * | 9/2009 |
| DE | 20 2009 009607 U1 | 10/2009 |
| EP | 1 498 927 B1 | 1/2005 |

OTHER PUBLICATIONS

International Preliminary Report on Patentability for International Application No. PCT/EP2011/052995, dated Oct. 11, 2012 (7 pages).

* cited by examiner

BUSBAR FOR A POWER DISTRIBUTOR IN VEHICLES AND POWER DISTRIBUTOR HAVING SUCH A BUSBAR

RELATED CASE INFORMATION

This application is a 371 U.S. National Stage Application of International Application No. PCT/EP2011/052995, filed on Mar. 1, 2011, claiming priority to German application no. DE 10 2010 003 515.7, filed on Mar. 31, 2010, the entire disclosures of which are incorporated herein by reference.

The present invention relates to busbars for power distributors in vehicles.

As a rule, high currents of up to ca. 400 amps flow in such power distributors, which may be fuse boxes. As a result the busbar becomes hot in operation. In addition the power distributors are generally arranged in the region of the generator unit in the engine compartment and are therefore exposed to high temperatures both when the vehicle is stationary, owing to possible solar radiation, and when the engine is running, owing to the waste heat from the engine. Owing to these high temperatures the busbar as well as the housing of the power distributor expand, and to different extents on account of the different materials. On account of the different expansion high stresses on the elements, in particular fuses, connected to the busbar are likely, which can lead to the failure or damage of the fastened elements.

In order to solve this problem DE 20 2009 009 607 U1 proposes a central compensation section between two fixing sections of the busbar. Busbars are as a rule fastened to several sections in or on the housing of the power distributor. A compensation section is proposed between two such fixing sections.

On account of the often only limited available installation space and different configurations, such a compensation section cannot always be provided between two fixing points.

The object of the present invention is accordingly based on providing an alternative to the aforementioned compensation section between two fastening sections that can be realised in a simple way independently of the existing installation space.

This object is achieved by a busbar having the features of claim 1. Advantageous modifications of the present invention are disclosed in the subclaims.

The underlying idea of the present invention is not to arrange the compensation section centrally between two fixing regions, but to separate the fixing regions of the busbar, to which fuses are to be fastened, which connect the busbar to a consumer, by slots from the remaining part of the busbar so that the fastening region is joined to the remaining part of the busbar only over a cross-section necessary for the transmission of current. In this connection the slots are not arranged centrally, but in each case in the immediate vicinity of the fastening regions. Furthermore the fastening region and the remaining part of the busbar preferably lie in the same plane (flush with one another) or in parallel planes (displaced parallel with respect to one another). Owing to the presence of the slots the shape of the busbars can be retained in relation to their circumference, so that the present invention can also be used with existing busbars without great expense and modification of other components. Furthermore, due to the removal of material in the region of the slots no more or less installation space is needed. Finally, this configuration can easily be realised in fabrication and production.

Accordingly the present invention proposes a busbar for a power distributor in vehicles, which comprises at least one fastening region for fuses. This fastening region is a fastening region on which a fuse can be connected to the busbar. The fuse is connected at the other end to a consumer or a consumer circuit. The fastening region may be of any arbitrary type. Plug-and-socket connections, cohesive connections, welded or bonded connections, etc. may be employed. The fuse extends from the fastening of the fuse on the busbar to the contacting of the fuse with a further electrical lead for the connection to the consumer or consumer circuit (longitudinal elongation direction of the fuse). The fuses are preferably fuses according to ISO 8820-5 (Type SF30 and SF51) with asymmetrically contoured Z-shaped or S-shaped fuse elements. The fastening region to which the fuse is to be fastened is, as was mentioned in the introduction, separated from the remaining part of the busbar by at least one slot that (completely) cuts through the busbar, so that a connection of the fastening region to the remaining part of the busbar takes place only via a web. The cross-section of the web is in this connection sufficiently large in order to be able to transmit the necessary current, but is smaller in comparison to the adjoining fastening region and the adjoining remaining part of the busbar. The slot preferably has a width perpendicular to the thickness of the busbar of preferably less than 3 mm, most preferably less than 1.5 mm, but at least 0.1 mm, most preferably at least 0.2 mm. Furthermore the busbar, which is sometimes also termed a blanking skeleton since it can be stamped out from a solid material, is made of an electrically conducting material with a high conductivity. It has throughout a thickness of at least 0.5 mm and preferably at most 4 mm. Advantageously it consists of copper or copper alloys. Alternatively aluminium or aluminium alloys are also conceivable. Owing to the connection of the fastening region via the web to the remaining part of the busbar, a certain flexibility of the fastening region with the remaining part of the busbar is ensured. In this connection a flexibility at least in the longitudinal elongation direction of the fuse should be ensured. Due to this flexibility any occurring forces on account of temperature variations and different movements of the housing of the power distributor and busbar can be compensated, so that the forces are not transferred to the fuse being fastened, thereby resulting in a significantly increased service life.

Preferably in so doing it is preferred that movements in each case in the region around 90° with respect to the forces introduced via the fuse can be absorbed. It is therefore advantageous if the web has a component at least in these directions. According to a particularly preferred embodiment the longitudinal elongation of the web runs from the fastening region to the remaining part of the busbar in such a way that it intersects the longitudinal elongation direction of the fuse to be fastened to the fastening region. Insofar as this is possible from the configuration of the busbar, it is particularly preferred if the longitudinal elongation of the web from the fastening region to the remaining part of the busbar and the longitudinal elongation direction of the fuses to be fastened to the fastening region intersect substantially perpendicularly, in order to achieve an optimal alignment with respect to the introduced forces. "Substantially" means in this connection a deviation in the sense of ±20°. On account of these modifications it is preferred that the slots have a component parallel to the longitudinal elongation direction of the fuse to be fastened to the fastening region, as well as transverse, in particular perpendicular, to this direction. In this connection the slots can be rectilinear in shape as well as curved. Also, combined shapes are conceivable, in which rectilinear sections are connected to one another via curved sections. In order to achieve a complete separation of the fastening regions from the remaining part of the busbar with the exception of the web, the slot or slots are open at the edge of the busbar. In other words, the slots begin at a circumferential edge (on the circumference) of the busbar and from there run round the respective fastening region. The ends lie within the circumference of the busbar.

According to a preferred embodiment the fastening regions can have a through opening for fastening the fuse. In this case a screw connection can be used to fasten the fuse to the busbar. The through opening has a maximum width perpendicular to the contour of the through opening through the busbar and to its mid axis. If the through opening is a circular through opening, then the maximum width is determined by the diameter of the through opening. In the case of a square or rectangular through opening, the maximum width would be the diagonal. In this modification it is preferred that the width of the web in the plane of the fastening region and perpendicular to the contour of the through opening is less than or equal to the maximum width. The minimum size of the web is predetermined by the necessary current conduction capability. The width of the web is according to a preferred embodiment at least 1 mm and at most 5 mm. In the case of through openings for fastening the fuses the longitudinal elongation direction of the fuse is obtained by joining the mid points of the through opening of a fastening region on the one hand and of a fastening opening for the fuse for connection to an electrical consumer on the other hand.

Generally a busbar is used to connect a plurality of consumers or consumer circuits to a power source. For this purpose several fastening regions are preferably provided. These are preferably separated in each case by at least one slot cutting through the busbar from the remaining part of the busbar, so that the respective fastening region is connected to the remaining part of the busbars via a web, whose cross-section is smaller compared to the respectively adjoining fastening region and the respectively adjoining remaining part of the busbar.

In addition the busbar includes according to a particular embodiment, preferably at least two fixing regions for fixing the busbar to a support, for example to the housing of a power distributor. At least one fastening region lies between two fixing regions. However, a plurality of fastening regions may also lie between two fixing regions.

In addition to the busbar the present invention also relates to a power distributor for vehicles comprising a busbar described above. In this connection the busbar is preferably secured via the fixing regions in a housing of the power distributor. The housing serves as a carrier. According to one embodiment the housing and the busbar are made of materials with different coefficients of thermal expansion. Furthermore, at least one fuse is connected via the fastening region on the one hand to the busbar and on the other hand to a consumer.

Further features and advantages of the present invention, which can be taken in isolation or employed in combination with one or more of the above features insofar as they do not conflict with the features, are disclosed in the following description of preferred embodiments and with reference to the accompanying drawings, in which.

Figure 1:
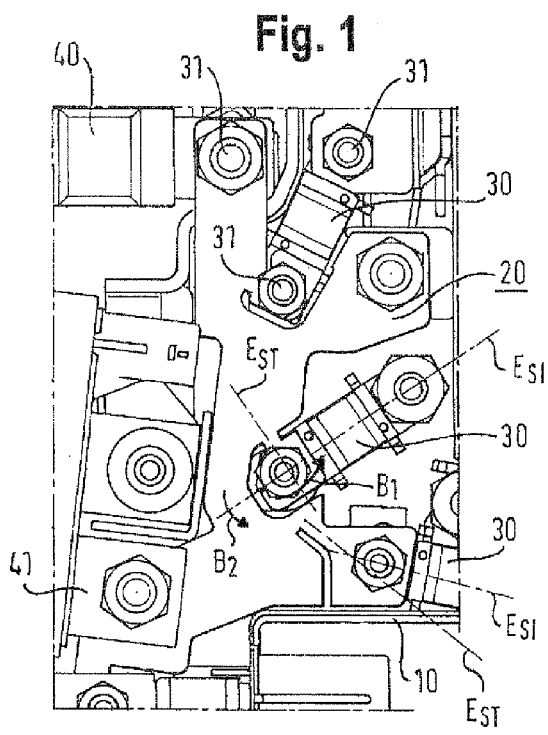
FIG. 1 shows a schematic plan view of a busbar according to the invention that is installed in a power distributor.

FIG. 1 shows part of a housing 10 of a power distributor, in which the busbar 20 of the present invention is used. A busbar 20, which connects a power source (not shown) via a plurality of fuses 30 to a consumer or consumer circuit (not shown), is fixed in the housing 10. Furthermore the busbar can additionally be configured for connection to other electrical or electronic components, as shown for example in FIG. 1 with the fuse 30 or the relay 41.

Figure 2:
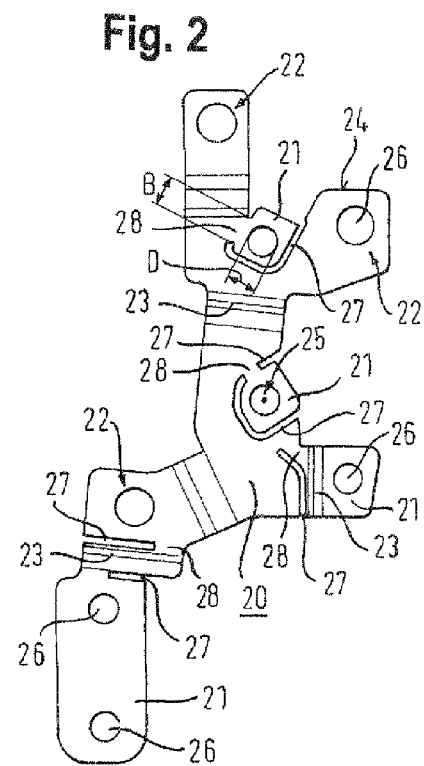
FIG. 2 shows the busbar of FIG. 1 separately in a plan view.

The busbar 20, as shown individually in FIG. 2, preferably consists of a metallic material, for example a copper alloy. Alternatively however an aluminium alloy is also possible. The housing 10 is preferably made of plastic material and thus of a material having a different thermal coefficient of expansion than the current-conducting busbar 20.

The busbar 20 is stamped out from a metal sheet and can optionally have one or more curved portions 23 about axes parallel to the plane of the metal sheet. The main longitudinal elongation direction is however substantially planar and parallel to a plane. In other words, the parts connected by curved portions 23 lie parallel to one another. The busbar 20 has a circumferential edge 24, which predetermines the contour of the busbar 20. Furthermore a plurality of fixing regions 22 are provided, via which the busbar 20 is fixed, i.e. located, on the housing 10 (carrier) of the power distributor.

Apart from the fixing regions 22, which primarily serve to fix the busbar in the housing 10, a plurality of fastening regions 21 are also provided, which are designed for fastening a fuse 30 to the busbar 20. In this connection a fixing of the respective fastening regions 21 relative to the housing 10 can also take place in this region. Since the fastening regions however occupy only a very limited surface, temperature changes within the fastening regions 21 cannot lead to the disadvantages described in the introduction. Thus, a specific fixing is not problematical in this case, and does not adversely affect the flexibility of the fastening regions, as is described later. In particular the flexibility simply has to be ensured between the fastening regions and the, by comparison, larger planar rigid busbar 20 and the remaining part thereof.

In the illustrated embodiment the fixing regions 22 as well as the fastening regions 21 are provided with circular through openings, which in each case completely pass through the busbar 20. In other words, bolt combinations 31 are chosen for the fixing of the busbar 20 in the housing 10 as well as for the fastening of the fuses 30 in the fastening region 21, as can be seen in particular from FIG. 1. As is likewise shown in FIG. 2, a plurality of through openings 26 can also be provided in a fastening region 21. The fastening regions 21 and the fixing regions 22 as well as the remaining parts of the busbar then lie substantially parallel to one another with the exception of the curved portions 23.

According to the present invention at least one of the fastening regions 21 (preferably all) is separated by at least one slit 27 to such an extent from the remaining part of the busbar 20 that a connection of the fastening region 21 takes place only via a web 28.

This web 28 has a cross-section that is correspondingly large so as to be able to transmit the necessary current. Its cross-section is however significantly smaller than the adjoining fastening region as well as the adjoining remaining part of the busbar. The thickness of the web 28 corresponds perpendicularly to the (sheet metal) area of the thickness of the busbar in this direction (perpendicular to the plane of the sheet in FIG. 2).

In addition the webs are if possible advantageously aligned so that their longitudinal elongation between the fastening region 21 and the remaining part of the busbar 20 runs substantially perpendicular to the longitudinal elongation direction of the respective fuse 30. This is illustrated purely by way of example in FIG. 1, in which the longitudinal elongation direction $E_{SI}$ of the respective fuse 30 runs perpendicular to the longitudinal elongation direction $E_{ST}$. A flexibility $B_1$, i.e. about an axis perpendicular to the point of intersection of the longitudinal elongations $E_{SI}$ and $E_{ST}$, is therefore possible. In addition there is also a flexibility $B_2$ about the axis $E_{SI}$.

The slots 27 run in each case starting from the edge 24 of the busbar 20 and are open on one side on this edge. In order to achieve the aforementioned longitudinal elongation direction of the webs, it is preferred that the slots 27 have at least one component parallel to the longitudinal elongation direction $E_{SI}$ of the fuse and a component transverse thereto. If for reasons due to the installation space it is not possible that a perpendicular section of the longitudinal elongation directions $E_{ST}$ and $E_{ST}$ can be achieved, then it is at least preferred that these directions intersect, as is illustrated in the bottom right-hand section of FIG. 1.

The slots 27 can be rectilinear and/or curved. Rectilinear portions can optionally be joined by a curved portion. The web 28 can also optionally be formed by two slots 27, as is evident at the bottom of FIG. 2.

Figure 3:
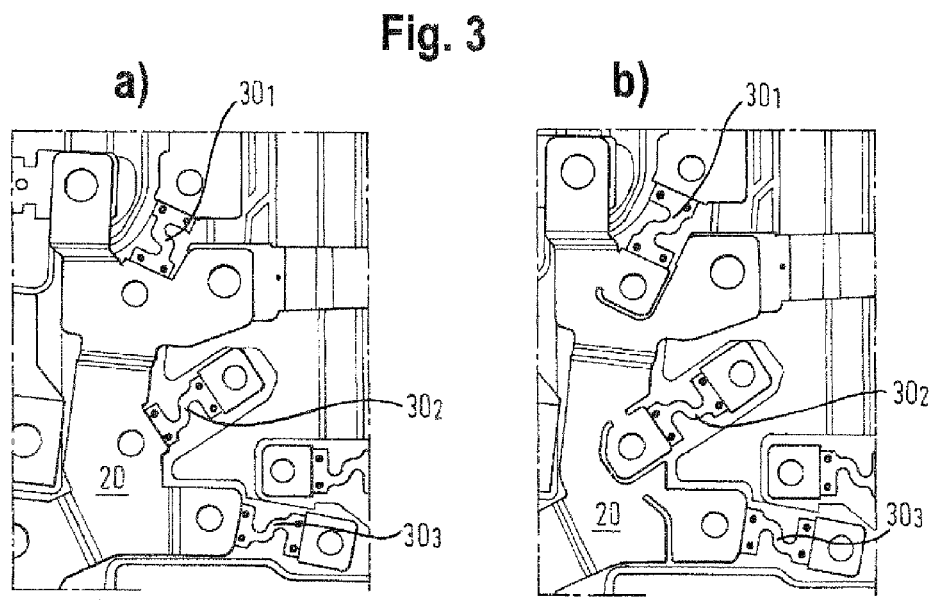
FIG. 3a shows a section of a busbar without the slots according to the invention.
FIG. 3b shows a busbar with the slots according to the invention.

The fuses 30 (FIG. 1) are preferably asymmetrical fuses with a S-shaped or Z-shaped contour (here fuses of the MIDI or MEGA type or other electrical components can for example be used). The S-shaped contour is in this connection evident for example from FIG. 3.

Forces acting on the fuses due to temperature variation stresses were calculated in the context of a FEM (finite elements method). In this connection on the one hand a busbar 20 with correspondingly provided fuses $30_1$, $30_2$, $30_3$ without the slots according to the invention was calculated (FIG. 3a), and the same busbar was calculated with slots, as in FIG. 3b.

In this connection the stresses acting on the fuses were calculated and are shown in the following table.

TABLE 1

| Fuse | FIG. 3a | FIG. 3b |
| --- | --- | --- |
| $30_1$ | 208 N/mm$^2$ | 162 N/mm$^2$ |
| $30_2$ | 180 N/mm$^2$ | 158 N/mm$^2$ |
| $30_3$ | 211 N/mm$^2$ | 204 N/mm$^2$ |

From Table 1 above it is clear that the incorporation of the slots 27 into the busbar and the cutting free of the fastening regions 21 associated therewith leads to a significant reduction of the stresses acting on the fuses. An increase in the service life of the respective fuses is furthermore also connected with this. In addition the slots 27 can be incorporated in a very simple way and at the same time as the stamping-out of the busbar 20. In other words, in order to employ the present invention the same method can be used without additional finishing steps. The busbar according to the invention can thereby be produced simply and inexpensively. In addition no additional installation spaces are necessary, so that the present invention can be employed very flexibly and independently of the existing installation space. Also it is conceivable to use the present invention in existing systems without having to refashion the periphery surrounding the busbar, for example the power distribution housing.

It is understood that the description of the above embodiment is given purely by way of example and that more or fewer fixing regions 22 or fastening regions 21 can be provided. It is also conceivable that not all fastening regions 21 are separated so far from the remaining part of the busbar 20 by slots 27 that the webs 28 are formed.

The invention claimed is:

1. A power distributor for vehicles, the power distributor comprising:
   a housing;
   a busbar including at least one fastening portion, at least two fixing portions, and a remaining conducting part, the busbar being fixed to the housing via the at least two fixing portions; and
   at least one fuse fastened directly to the fastening portion by at least one mechanical fastener,
   wherein:
      the housing and the bus bar are formed from materials with different coefficients of thermal expansion,
      the fastening portion is partially separated from the remaining conducting part of the busbar such that the fastening portion is connected to the remaining conducting part of the busbar via a web, wherein the web is located between the at least two fixing portions along a current conducting direction between the at least two fixing portions,
      the web:
         having a cross-section smaller than a cross-section of the connected fastening portion and smaller than a cross-section of the connected remaining conducting part of the busbar, and
         having a length along a current conducting direction between the fastening portion and the remaining conducting part of the busbar and a width along a direction transverse to the current conducting direction, the length of the web being smaller than or equal to the width of the web.

2. The power distributor according to claim 1, wherein the longitudinal elongation of the web from the fastening portion to the remaining conducting part of the busbar intersects the longitudinal elongation direction of the fuse.

3. The power distributor according to claim 2, wherein the longitudinal elongation of the web from the fastening portion to the remaining conducting part of the bus bar intersects substantially perpendicularly the longitudinal elongation direction of the fuse.

4. The power distributor according to claim 1, wherein one end of the slot is open at the edge of the bus bar.

5. The power distributor according to claim 1, wherein the fastening portion has a through opening, to which the fuse is fastened, with a maximum width perpendicular to the contour of the through opening, the width of the web being smaller than or equal to the maximum width of the fastening opening.

6. The power distributor according to claim 1, wherein the at least one fastening portion includes a plurality of fastening portions.

7. The power distributor according to claim 1, wherein the mechanical fastener includes a bolt or a screw.

* * * * *